(12) United States Patent
Cui et al.

(10) Patent No.: US 7,018,746 B2
(45) Date of Patent: Mar. 28, 2006

(54) METHOD OF VERIFYING THE PLACEMENT OF SUB-RESOLUTION ASSIST FEATURES IN A PHOTOMASK LAYOUT

(75) Inventors: Yuping Cui, Fishkill, NY (US); Rama Nand Singh, Bethel, CT (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 10/249,509

(22) Filed: Apr. 15, 2003

(65) Prior Publication Data

US 2004/0209169 A1    Oct. 21, 2004

(51) Int. Cl.
*G03F 9/00* (2006.01)
*G06F 17/50* (2006.01)

(52) U.S. Cl. ............... 430/5; 430/30; 716/19; 716/2; 716/5; 716/11; 716/8; 716/21

(58) Field of Classification Search .......... 430/30, 430/5; 716/19, 2, 5, 8, 11, 21
See application file for complete search history.

(56) References Cited

U.S. PATENT DOCUMENTS

| | | | |
|---|---|---|---|
| 5,447,810 A | | 9/1995 | Chen et al. |
| 5,958,635 A | * | 9/1999 | Reich et al. ............. 430/30 |
| 6,303,253 B1 | * | 10/2001 | Lu ............. 430/5 |
| 6,413,683 B1 | | 7/2002 | Liebmann et al. |

* cited by examiner

*Primary Examiner*—Saleha R. Mohamedulla
(74) *Attorney, Agent, or Firm*—H. Daniel Schnurmann (57) ABSTRACT

A method of verifying the placement of sub-resolution assist features (SRAFs) in a photomask layout is described. SRAFs are added to the photomask layout to enhance the process window for semi-isolated and isolated features. Rules are provided to automatically place the SRAFs into the layout. When deficiencies are detected in the assist feature design or in the automated SRAF placement program, the placement of SRAFs requires verification. The method verifies the correct placement by defining a unique image property linked to the accurate placement of the assist features, and combines it with in-situ image simulation of the individual layout. The placement of the SRAFs is verified by: 1) formulating a unique image property using a technology specific representative sample design with and without properly placed SRAFs; 2) simulating the resist image of each individual device layout in the photomask, considering the layout environment of each individual device, and analyzing the unique image properties associated with the device being examined; 3) sorting the geometric properties of each device into predetermined category; and 4) for each individual device layout, examining the image property value and geometric category values, and determining whether the device is adequately surrounded by SRAFs. If not, individual device on the photomask layout are marked with error marker shapes to be subsequently corrected.

20 Claims, 5 Drawing Sheets

METHOD OF VERIFYING THE PLACEMENT OF SUB-RESOLUTION ASSIST FEATURES IN A PHOTOMASK LAYOUT

BACKGROUND OF INVENTION

The present invention is related to semiconductor integrated circuit process technology, and more particularly, to a method of verifying a sub-resolution assist feature design to enhance the resolution of a photomask and improve the robustness of the lithography process in a semiconductor fabrication process.

Photolithography is routinely used to define patterns in semiconductor integrated circuits. As the minimum feature size of the integrated circuits continues to shrink, there are significant decreases in the lithography process window to generate minimum feature lines. Various resolution enhancement techniques have been generated in the past to improve the process stability when designing features at minimum dimensions. Sub-resolution assist features (SRAFs), also known as scattering bars, are used to facilitate the printing of semi-dense and isolated lines by increasing the optical density near the features to be imaged. Sub-resolution assist features are added to the photomask layout to facilitate the printing of the main features without resolving the assist features during silicon imaging. The aforementioned SRAFs are one of the evolving resolution enhancement techniques currently used for lithography having a low end process scaling factor (commonly referred to as k1 factor). The presence of sub-resolution assist features boosts the depth of focus, especially for small isolated design features.

The initial concept of using SRAFs to enhance the lithographic process robustness is described in U.S. Pat. No. 5,447,810 to Chen et al. The sub-resolution assist features provide increased depth of focus and minimize CD (critical dimension) differences between selected features. More particularly, Chen et al. show the benefit of assist features through contacts when used in conjunction with quadruple illumination. However, Chen at al. are only concerned with the placement of very simple assist features, limiting themselves to using one assist feature per isolated edge. Moreover, no reference is made on how to systematize the design and optimally place features.

Lately, there has been significant development work to adapt the initial concept to a full manufacturing solution. One of the main advancements is to develop a so-called sub-resolution assist feature design strategy. In an article by Scott M. Mansfield et al. "Lithographic comparison of assist feature design strategies" published in the Proceedings of SPIE—International Society for Optical Engineering (USA) Vol. 4000, pp. 63–76, there are described design strategies for sub-resolution assist features by using multiple SRAFs (the number of sub-resolution assist features varying from one to four assist feature per space). Mansfield et al. describe the theory and experimental results to optimize: 1) the proper assist feature width applicable to lithographic tooling and illumination condition, 2) the distance from the assist to the main design detail, and 3) the number of assist features to be used for each space. Mansfield et al. further discuss the photomask fabrication and various inspection limitations in the presence of sub-resolution assist features, and examine the sensitivity of the photomask layout to the lithographic tool components and settings. The above method, when applied to the SRAF design strategy, provides accurate rules to place assist feature in a one-dimensional environment for a plurality of design pitches. However, it does not include algorithms or computer programs to automatically place SRAF in the photomask layout of an integrated circuit (IC) chip design. In order to apply the SRAF design strategy to a full IC chip design, the complexity of the layout needs to be fully anticipated and the heuristics for the placement of the assist feature need to be developed.

Implementing the SRAF design strategy into a complex real chip design by developing automated software tools/ algorithms is described in U.S. Pat. No. 6,413,683 to Liebmann et al. Therein, a method is provided for placing SRAFs in a photomask layout by considering details of the electrical circuit, in order to establish priorities for placing SRAFs and resolve conflicts during the placement thereof.

The proficiency of the assist feature software tools is sometimes limited by the complexity of the two-dimensional layout and by the mask layout inspection limit induced clean up. Depending on the individual design style, a semiconductor circuit can be represented by various layout configurations that obey design rules. As the design style changes from the electrical circuit functionality and individual design practices, the software algorithms that work on one design may fail on another. Oftentimes, to maintain the generality of the software, the cleanup that is required to remove the SRAFs may introduce mask and process issues that are overly aggressive. Inadequate removal of assist features can be detrimental to the main design features, (which will be explained hereinafter in more detail). The above mentioned imperfections are caused by a prioritization that occurs during placement and by a cleanup that relies on empirical rules or which is bound by a limited experience of the properties of the assist features rather than by an accurate description of what is needed for a given layout situation. The assist feature placement rules are generally derived from a one-dimensional environment. When converted to a two-dimensional product layout, the placement algorithm interprets the assist feature placement rules, leaving the prioritizing and placement become dependent on empirical experience. By way of example, "L"shaped assist features may be removed because under certain layout situations, the "L"shaped assist features are printed in silicon resist image. However, not all "L"shape assist features print in silicon image. If they do not print and are instead removed, the main feature may, as a result, suffer CD variations in the absence of the assist feature. Generic style options available in current SRAF generation algorithm do not consider the rich variation of details typical of a true layout, and therefore they fail to provide the best possible placement strategy tailored to a particular layout situation.

SUMMARY OF INVENTION

Accordingly, it is an object of the present invention to provide a method for verifying the existence of SRAFs in the photomask where details of the electrical circuit layout require their presence.

It is another object of the present invention to provide a method for verifying that SRAFs are placed accurately on the photomask representing the electrical circuit layout.

It is still another object of the invention to provide an algorithm as a tool for verifying the proper placement of SRAFs in the layout of an IC chip design.

It is a further object of the invention to provide a verification algorithm that considers every detail of the layout which is impacted by the presence or absence of other SRAFs.

The foregoing objects are achieved as will be described. In accordance with the method of the present invention, an optical property that is dominated by the presence of SRAFs, and which has a significantly different behavior when the main features are provided with or without the assist features. This optical property makes it possible to accurately verify the placement of the SRAFs in an IC chip design.

To this end, an optical simulation is first performed on a representative sample photomask layout. Trained optical models are generated based on experimental data through a model fit of the experimental data. A representative sample photomask layout is designed to contain essential one and two-dimensional features. The layout is then placed with and without the optimized assist features. Using trained optical models, the previously mentioned optical image property is formulated which differentiates the photomask layout with and without the sub-resolution assist features. The product electrical circuits are then placed with assist features. Optical simulation is then performed on a photomask layout consisting of electrical circuits. Details of electrical circuit, such as feature dimension and proximity to neighboring design features are categorized (i.e., sorted out) into different categories. Finally, a unique image property for each layout detail in the electrical circuits is combined with the geometrical details of the electrical circuit, providing an analysis of the quality and accuracy of the placement.

Thus, the present invention provides a method of verifying the presence and the placement of sub-resolution assist features (SRAFs) in a photomask layout of an integrated circuit (IC) chip design that includes the steps of: a) determining selected optical image properties of main features of a sample layout in the presence or absence of SRAFs; b) analyzing optical image properties of the main features to establish a criterion for subsequent placement of SRAFs in the photomask layout of the IC chip design; c) performing a simulation on the photomask layout of the complete IC chip deign; d) sorting the photomask layout geometry based on predetermined categories; and e) based on the established criterion, identifying regions of the photomask layout that are lacking adequate placement of SRAFs and correcting the inadequate placement of the SRAFs.

BRIEF DESCRIPTION OF DRAWINGS

These and other objects, aspects and advantages of the invention will become apparent from the detailed description of the invention when taken in conjunction with the accompanying drawings, in which.

DETAILED DESCRIPTION

Figure 1A:
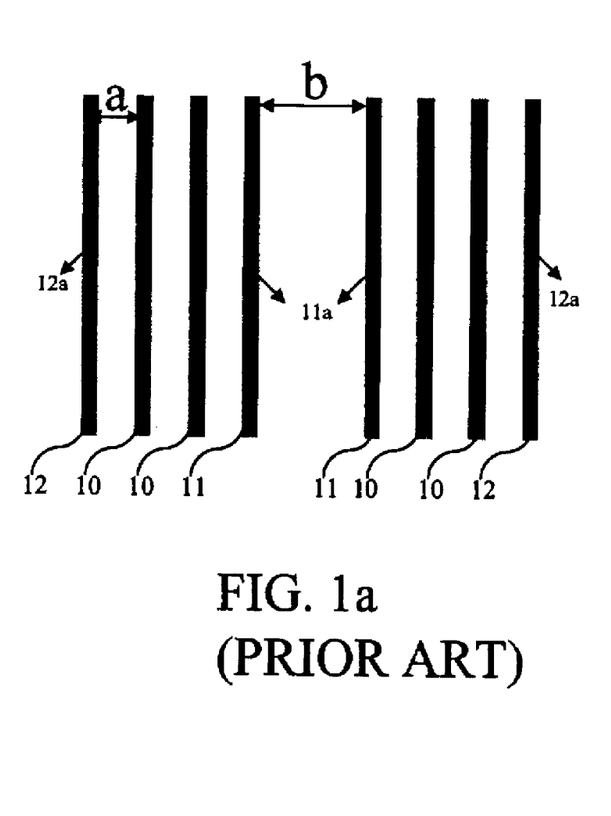
FIGS. 1a–1b illustrate conventional SRAFs in a photomask layout.
Figure 1B:
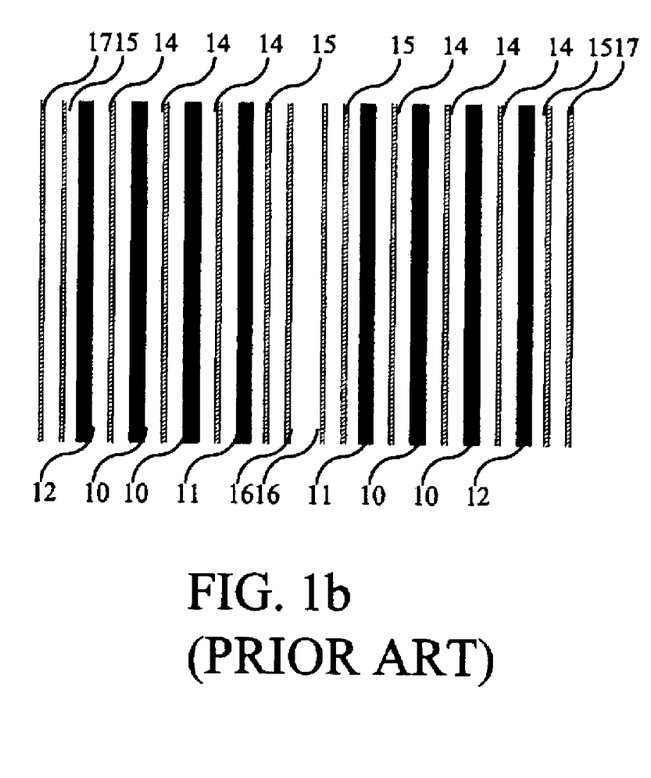

With reference to the figures, and in particular to FIGS. 1a and 1b, there is depicted a conventional layout provided with SRAFs features to facilitate the printing of semi-dense and isolated lines. Features 10, 11, and 12 represent the main design details, with features 10 representing the semi-dense lines. Features 10 are separated from features 12 by space "a". Features 11 and 12 are shown each having one isolated edge 11a and 12a. The space "b" between two features is referenced by numeral 11.

Referring to FIG. 1b, there are shown SRAFs added to the photomask layout, the SRAFs being labeled by way of numerals 14, 15, 16 and 17. Based on the sub-resolution assist feature design strategy, these small bars are placed at certain distance away from the main detail features. For a given space depending on the dimensions of the space, the number of sub-resolution assist features to be placed is specified by the assist feature design strategy through simulation that optimizes the overall lithography process window. In the exemplary case, each space "a" requires one sub-resolution assist feature, and each space "b", four-SRAFs (two SRAFs per main detail). For each space, the proximity of sub-resolution assist features to the main details is optimized by the sub-resolution assist feature design strategy, the criteria and methods used for this optimization taking into consideration the lithographic focus window, the mask making constraints, and whether or not the SRAFs are to be printed. Additional details can be found in the previously referenced paper by Mansfield et al. With the added sub-resolution assist features, isolated features 11 and 12 will have similar optical density as dense features 10. As a result:

1) The lithography process window for isolated lines has better overlap than that of dense lines, 2) The overall common process window to print features 10, 11 and 12 is increased, and 3) The overall process robustness is improved.

The technical challenges to implement the placement of SRAFs into a photomask layout are mainly due to layout complexities that exist in an electrical circuit design. The sub-resolution assist features design strategies are generated based on one-dimensional design structures. In each one-dimensional design space, the sub-resolution assist feature design strategies optimize the following variables: the width of assist feature, the number of assist feature for each design space, and the distance between an assist feature and the main detail.

Following the assist feature design strategy, a computer program generates and places the sub-resolution assist features into the photomask layout. The placement program interprets and translates the one-dimensional sub-resolution assist feature design strategy into physical shapes in a complex two-dimensional layout.

A number of factors are considered during the sub-resolution assist features placement, namely:

1) The layout design prioritization (sorting out critical features versus less critical features);

2) A conflict resolution, i.e., to provide the best solution in an competing layout environment, and 3) Optimizing the clean up steps to prevent printing the sub-resolution assist features. This relates to examples but it is not limited to SRAFs forming T shapes, L shapes and+ shapes having a high risk of being printed on silicon. Due to the unavoidable corner rounding generated by the photomask fabrication process, the above illustrative types of structure end up being larger than designed which may result printing in silicon under certain imaging conditions. Therefore, such shapes should preferably be eliminated altogether from the photomask layout. The sub-resolution assist feature placement software offers generic type options that one may choose to avoid printing certain configurations of assist features. As a consequence of the complexities described, the output from the SRAF placement program having generic type options derived from experience (i.e., not accurate in-situ simulation) often contains imperfections associated with unique layout situations.

For each pre-sorted design pitch, the maximum image properties of the main details are examined. The Boolean can be described by the following pseudo code: For each main detail x:

If pitch=$B^x_{geom}$

Then, is $B^x_{image}=B^j_{image}$ ?

If yes–>report missing,

If no–>continue.

If the main detail on the photomask layout is positive after the Boolean operation, it becomes the output to Block 57. If the main detail returns negative on the Boolean operation, the program does not perform any further operation and continues with the same operation on the next main detail.

Figure 2:
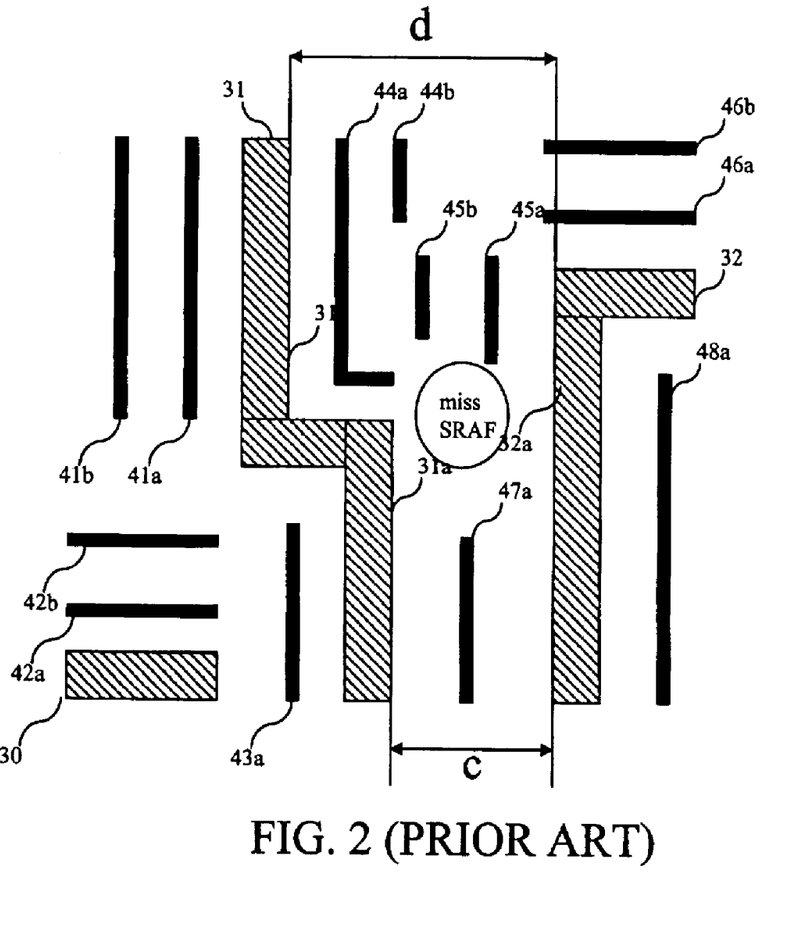
FIG. 2 shows a conventional photomask layout where SRAFs are missing in the device portion of the electrical circuit.

In the present example, the maximum number of SRAFs per space is 4. However, the actual maximum number of SRAFs is determined by optimizing the process window for the main details. It is, therefore, not limited to the case being described herein. Line 41a is the first SRAF to the left edge of main detail 31, while 41b is the second SRAF of the left edge of main detail 31. Space "c", which is formed by edges 31a and 32a of the main details, requires only one SRAF based on the assist design strategy for the given space. Space "d" formed by edge 31b and 32a requires three SRAFs based on the assist design strategy for a given space. The location of SRAFs 47a and 45a are shown having a vertical offset. The placement program decides that assist feature 47a and 45a should not be joined, leaving a critical region with no SRAFs. A cleanup is generally performed to prevent assist features from printing, but the general cleanup is not applicable in the exemplary layout. This type of less than perfect conflict resolution cannot be easily avoided because of the vast number of layout types that may exist in the assist feature placement program. Furthermore, the photomask layout is highly complex, causing SRAFs making a transition from space "a" to space "b" to be lost. Missing SRAFs can cause undesirable sensitivities to process variations in the line width of the main details. For instance, portions of edge 31a and 32a lack SRAF coverage in the adjacent space (labeled "miss SRAF" in FIG. 2) which is due to the previously mentioned deficiencies in the assist feature placement algorithm/tool. There could also be a potential line necking or even a complete disconnect of lines (commonly known as open) at wafer level. It is, therefore, important to capture those instances of missing sub-resolution assist features for further improvement before the photomask is fabricated. The following details the algorithm used in this invention to capture these missing sub-resolution assist features in photo mask layout.

The sub-resolution assist features do not print on silicon, as the purpose of SRAFs is to provide assistance to the main design details that are part of semi-conductor device. The sub-resolution assist features are designed sufficiently small to enhance the printing of main design details, albeit not yet resolved in silicon. However, they impact the optical properties of the main details. When a light beam shines through the photomask into the photo resist, the resist image that is developed is determined by the maximum and minimum image intensity, the image slope and curvature, and the like. Upon close examination of the various components of the optical image, a key image property, i.e., the maximum image intensity at positions where SRAFs are to be present identifies, among others, missing SRAFs in the photomask layout.

Figure 3:
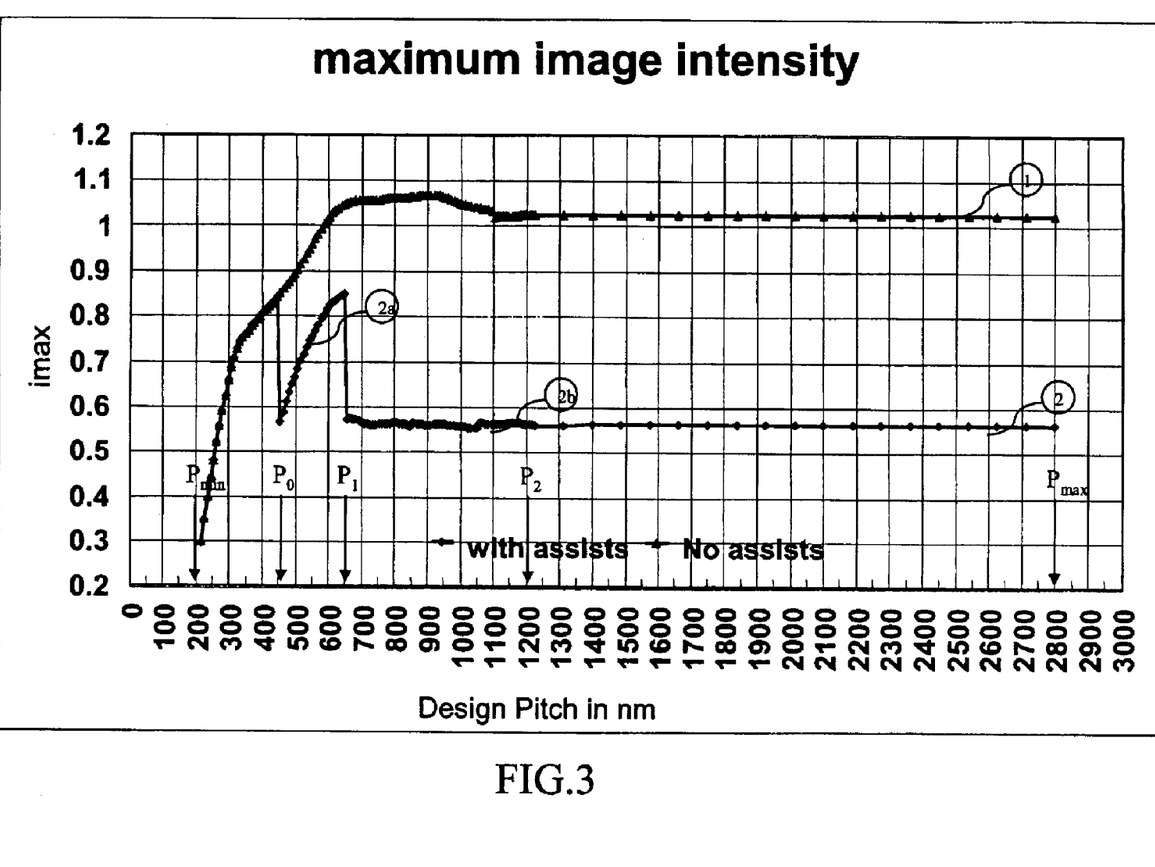
FIG. 3 illustrates the lithography image property as a function of design details in the presence of SRAFs.

FIG. 3 shows that the maximum image intensity in the developed resist has a unique correlation to the presence of SRAFs in the photomask layout. FIG. 3 also shows that the previously mentioned is a function of a different design pitch. The maximum image intensity is plotted on the y-axis. The x-axis represents the design pitch value (in nanometers) increasing from left to right. The above results are simulated with a calibrated resist image model. The simulation is performed, preferably, on a 90 nm technology, on all possible design pitches. $P_{min}$, $P_{max}$ represent, respectively, the minimum and maximum pitch for the 90 nm technology. For a pitch value between $P_{min}$ and $P_0$, no sub-resolution assist feature is required in the corresponding photomask layout. For pitch values between $P_0$ and $P_1$, one SRAF exists for each space in the main detail. For pitch values between $P_1$ and $P_2$, two sub-resolution assist features are present for each space in the main detail. For pitch values between $P_2$ and $P_{max}$, two or more SRAFs exist for each space in the main detail. The maximum intensity for all design details having SRAFs is illustrated in plot 2, and the maximum intensity for all the design details lacking SRAFs is illustrated in plot 1. For the main details having a design pitch $P_1$ and maximum image intensity greater than 0.8, one may deduct that the main feature does not have an SRAF in the photomask layout. As shown in FIG. 3, for the given lithographical imaging condition used in the example, if the main detail with pitch $P_1$ has adjoining SRAFs, the simulated maximum intensity should be below the value 0.8. On the other hand, when the main detail having a pitch $P_1$ lacks proper SRAFs, then the maximum intensity of the main detail will be greater than 1. Overall, for main features with and without properly placed assist features, there exists a separate characteristic image intensity profile. This is because when the main detail has properly placed SRAFs, its maximum image intensity is controlled in a structured manner to ensure that the best process window for the main feature was employed.

Figure 4:
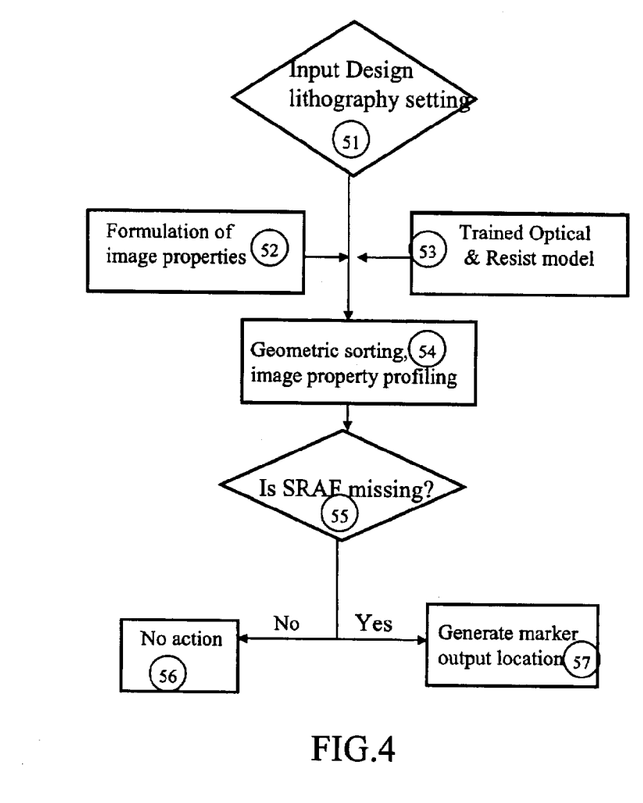
FIG. 4 is a schematic illustration of an algorithm that verifies the placement of the SRAFs in accordance with the present invention.

For the above-described maximum image intensity phenomena, a computer program was developed to verify the placement of SRAFs. FIG. 4 shows a flow chart representing the algorithm of the verification method.

Block 51 requires two inputs to the program: the photomask layout to be verified, and lithography imaging conditions, such as exposure wavelength, numerical aperture and illumination conditions. The latter condition is used for the image property formulation step (block 52) and verification step (block 55).

A sample design is generated in Block 52 that includes all the design pitch existing for a given technology node. SRAF are then placed in the sample design. The sub-resolution assist feature placement is performed in accordance to a predetermined design strategy which specifies the assist feature width, the distance from each assist feature to main details, and the number of assists for each pitch. Image properties for each design pitch are then simulated with and without the SRAFs. For a given imaging condition, the maximum image intensity as a function of design pitch is formulated and placed in various categories, as previously described with reference to FIG. 3. For a given pitch, if the main detail is provided with SRAFs, the maximum image intensity should remain within a certain numerical value range. If the main details lack SRAF coverage, then their maximum image intensity will fall into a different numerical value range within Block 52, the maximum image intensity being formulated in mathematical form for the main feature having SRAFs, and for main features devoid of assist features.

Block 53 describes the process of calibrating optical and resists models which are associated with a given imaging process. The models obtained from this step are fed to Blocks 54 and 55 to perform optical and resist image simulation on the photomask layout.

Referring now to Block 54, the program analyzes the photomask layout in the following two aspects:

1) A pure geometric measurement of the main details of the photomask layout is taken, the output of which contains the main details sorted in different geometrical categories $B^i_{geom}$. Each geometric category contains main details with a predefined range of design pitches.

2) Optical simulation and image properties (specifically, the maximum intensity) profiling on all the main details. In this step, the main details in the photomask layout are fed into an optical simulation tool to gather the maximum image intensity associated for each main detail. The above main details may or may not have SRAFs or adjoining SRAFs. The numerical value of the maximum image intensity for a given main detail is determined, among others, by the main detail design pitch and the presence of the assist features. The output of this operation contains main details sorted in different image property categories $B^j_{image}$, and more specifically, the sorting is based on the maximum image intensity of the main details.

In Block 55, a sequence of Boolean operation is performed on the output of Block 54.

For each pre-sorted design pitch, the maximum image properties of the main details are examined. The Boolean can be described by the following pseudo code: For each main detail x: If pitch=$B^x_{geom}$ Then, is $B^x_{image}=B^j_{image}$ ? If yes−>report missing, If no−>continue If the main detail on the photomask layout is positive after the Boolean operation, it becomes the output to Block 57. If the main detail returns negative on the Boolean operation, the program does not perform any further operation and continues with the same operation on the next main detail.

In Block 57, locations of the main details that do not have proper SRAFs are fed into this operation. The locations of the main details lacking the proper SRAFs are represented by x and y coordinates relative to the origin of the entire photomask layout. The coordinates are recorded and stored in a data file. In addition, at the position of the main detail edge segment that do not have proper assist features, an error marker shape (typically, a rectangular bar) is generated on the design layer to facilitate identification of the main details.

Figure 5:
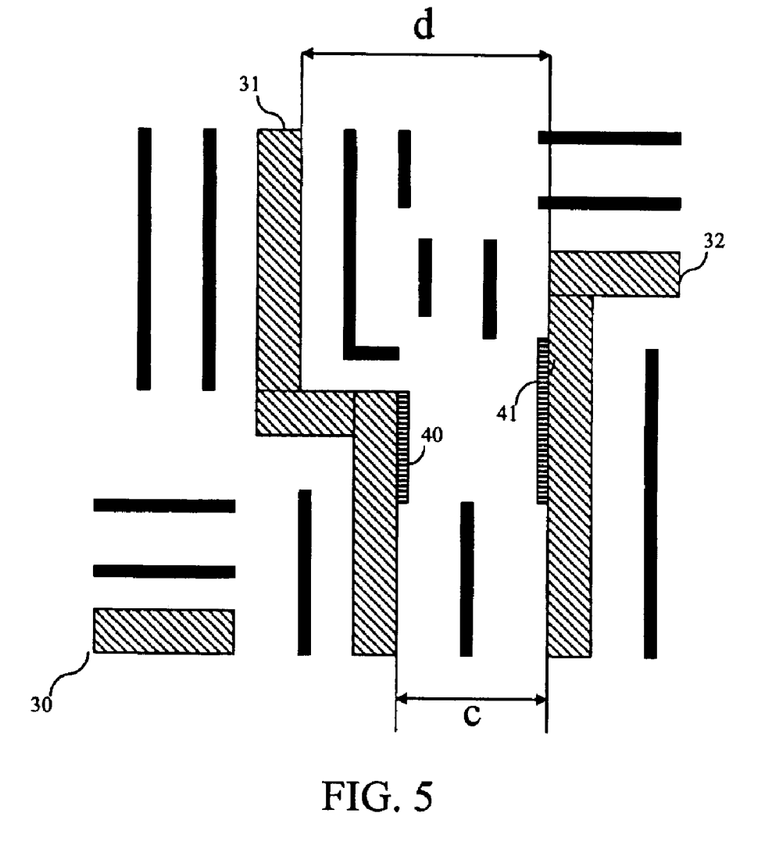
FIG. 5 illustrates the output of the software program that identifies a region of the photomask layout lacking the placement of SRAFs.

The key steps in the flow chart shown in FIG. 4 are illustrated in the example shown in FIG. 5. Therein, the main details 31 and 32 have portions of the edge devoid of SRAF coverage in the adjacent space.

The process is initiated by formulating an image intensity profile characteristic of the lithography condition (Block 51, 52 and 53) similar to FIG. 3. The computer program uses trained models and simulates the region of the photomask layout based on sorting of design pitch and simulated image properties (Block 54). The edge portion 40 of main detail 31 is identified as well as the edge portion 41 of main detail 32 as regions devoid of SRAFs (Block 55). Marker shapes 40 and 41 are then placed in the photomask layout at the error location (Block 57). The error location is also recorded in simple ASCII format with the corresponding x and y coordinates in the photomask layout. Without being properly assisted, the main details formed by edges 40 and 41 will print with smaller wafer dimensions in comparison with the designed CD dimension. The error locations are then fed into the SRAF placement tool for a revised placement of the assist features.

A computer program executing the aforementioned method and flow was developed. This program can be executed for the photomask layout for an integrated circuit chip and has been successfully used for SRAF placement verification.

Whereas the present invention has been described in terms of a preferred embodiment, it will be understood by those skilled in the art that numerous changes and modifications to the algorithm may be introduced without departing from the spirit of the invention, all of which fall within the scope of the appended claims.

What is claimed is:

1. A method of verifying the presence and the placement of sub-resolution assist features (SRAFs) in a photomask layout of an integrated circuit (IC) chip design, comprising the steps of:

determining selected optical image properties of main features of a sample layout in the presence or absence of SRAFs;

analyzing the optical image properties of the main features to establish a criterion for subsequent placement of SRAFs in the photomask layout of the IC chip design;

performing a simulation on the complete photomask layout of the IC chip design with SRAFs;

sorting the photo mask layout geometry based on predetermined categories; and based on the established criterion, identifying regions of the photomask layout lacking adequate placement of the SRAFs, and correcting the inadequate placement of the SRAFs.

2. The method as recited in claim 1, wherein the step of analyzing the optical image properties further comprises the steps of:

selecting unique optical properties that define the placement of SRAFs in the complete IC chip layout using representative sample designs with and without SRAFs; and correlating the unique optical image properties to the presence of the SRAFs in the layout and the characteristics of the main features.

3. The method as recited in claim 1, wherein said simulation is an optical simulation.

4. The method as recited in claim 3, wherein the simulation assigns sites to locations distributed throughout the photomask layout, and wherein for each site, the simulation considers all the main features and SRAFs residing within a predetermined range away from the site.

5. The method as recited in claim 4, wherein for each simulation site of a main feature, the simulation searches for the maximum intensity value in the vicinity of the simulation site.

6. The method as recited in claim 1, wherein the step of sorting the layout geometry further comprises determining for each of the features of the complete IC chip design its own geometry and the geometry of features in proximity thereof.

7. The method as recited in claim 1, wherein the step of identifying regions further comprises determining for each of the main features, whether the optical image property value and geometric property fits a predetermined profile of missing SRAFs.

8. The method as recited in claim 7, wherein the absence of the SRAFs identifies the main features from the complete IC chip layout that are segregated into a category by an erroneous placement of SRAFs.

9. A method for verifying the presence and the placement of sub-resolution assist features (SRAFs) in a photomask layout on an integrated circuit (IC) chip design comprising the steps of:
   generating a representative sample design of main features in the photomask layout;
   placing SRAFs into the representative sample design;
   calculating optical image properties of the main features in the presence or absence of SRAFs in the sample design in order to obtain an image profile of the main features;
   from the calculation of the optical image properties of the main features, determining a range of values of the main features in the presence or absence of SRAFs in the sample design;
   placing SRAFs into the photomask layout;
   simulating the photomask layout of the IC chip design for each of the main features of the photomask layout;
   calculating the optical image properties of each of the main features of the photomask layout considering layout details for each of the main features;
   categorizing each of the main features as a function of its proximity to adjacent features thereof;
   for each category of main features, examining their respective optical properties to determine when SRAFs are present; and
   in the absence of SRAFs, reporting and correcting the errors.

10. A method for verifying the presence and the placement of sub-resolution assist features (SRAFs) in a photomask layout of an integrated circuit (IC) chip design representing an electric circuit comprising the steps of:
    formulating an optical imaging property as differences in the photomask layout with and without SRAF placement;
    sorting geometric details of the electrical circuit into different categories;
    combining an optical image property with the geometrical details of the electrical circuit; and
    analyzing the quality and accuracy of the SRAFs placement.

11. An article of manufacture comprising a computer-usable medium having computer readable program code means embodied therein for verifying the placement of sub-resolution assist features (SRAFs) in a photomask layout of an integrated circuit (IC) chip design, the computer readable program code means in said article of manufacture comprising:
    computer readable program code means for determining selected optical image properties of main features of a sample layout in the presence or absence of SRAFs;
    computer readable program code means for analyzing the optical image properties of the main features to establish a criterion for subsequent placement of SRAFs in the photomask layout of the IC chip design;
    computer readable program code means for performing a simulation on the complete photomask layout of the IC chip design with the SRAFs;
    computer readable program code means for sorting the photomask layout geometry based on predetermined categories; and
    computer readable program code means for identifying, based on said established criterion, regions of the photomask layout lacking adequate placement of the SRAFs, and correcting the inadequate placement of the SRAFs.

12. A program storage device readable by a machine, tangibly embodying a program of instructions executable by the machine to perform a method of verifying the placement of sub-resolution assist features (SRAFs) in a photomask layout of an integrated circuit (IC) chip design, said method steps comprising:
    determining selected optical image properties of main features of a sample layout in the presence or absence of SRAFs;
    analyzing the optical image properties of the main features to establish a criterion for subsequent placement of SRAFs in the photomask layout of the IC chip design;
    performing a simulation on the complete photomask layout of the IC chip deign with the SRAFs;
    sorting the photomask layout geometry based on predetermined categories; and
    based on the established criterion, identifying regions of the photomask layout lacking adequate placement of the SRAFs, and correcting the inadequate placement of the SRAFs.

13. The method as recited in claim 1, wherein the simulation is performed for a predetermined technology on design pitches that include a minimum pitch $P_{min}$ and a maximum pitch $P_{max}$, both $P_{min}$ and $P_{max}$ pitches being characteristic of the predetermined technology/.

14. The method as recited in claim 13, wherein no SRAFs are placed in the photomask layout for design pitches between $P_{min}$ and $P_{max}$.

15. The method as recited in claim 13, wherein for intermediate design pitch values between $P_{min}$ and P0, no SRAF is required in the photomask layout; between design pitch values between P0 and P1, one SRAF are required in the photomask layout; and between design pitch values between P1 and $P_{max}$, two SRAFs are required.

16. The method as recited in claim 1, further comprising the step of: verifying the placement of SRAFs as a function of the photomask layout and as a function of lithographic imaging conditions.

17. The method as recited in claim 15, wherein the lithographic imaging conditions are selected from the group consisting of exposure wavelength, numerical aperture, illumination conditions, and any combination thereof.

18. The method as recited in claim 1, wherein the step of analyzing the optical image properties of the main features to establish the criterion for subsequent placement of SRAFs includes the steps of:
    taking geometric measurements of the main details of the photomask layout, and
    simulating the main details of the photomask layout to gather a maximum image intensity associated to each of the main details.

19. The method as recited in claim 18, wherein the maximum image intensity I determined by the design pitch for the main detail and the presence of SRAFs.

20. The method as recited in claim 1, wherein the step of sorting is based on the maximum image intensity of the main details.

* * * * *